United States Patent
Liu (10) Patent No.: US 9,901,121 B2
(45) Date of Patent: Feb. 27, 2018

(54) BATTERY ROD HAVING FALLING PROTECTION DESIGN AND ELECTRONIC CIGARETTE

(71) Applicant: Kimree Hi-Tech Inc., Tortola, Virgin Islands (GB)

(72) Inventor: Qiuming Liu, Guangdong (CN)

(73) Assignee: Huizhou Kimree Technology Co., Ltd. Shenzhen Branch, Guangdong (CN)

( * ) Notice: Subject to any disclaimer, the term of this patent is extended or adjusted under 35 U.S.C. 154(b) by 308 days.

(21) Appl. No.: 14/766,292

(22) PCT Filed: Mar. 3, 2014

(86) PCT No.: PCT/CN2014/072782
§ 371 (c)(1),
(2) Date: Aug. 6, 2015

(87) PCT Pub. No.: WO2015/109632
PCT Pub. Date: Jul. 30, 2015

(65) Prior Publication Data
US 2016/0000148 A1    Jan. 7, 2016

(30) Foreign Application Priority Data

Jan. 22, 2014   (CN) .................... 2014 2 0041618 U (51) Int. Cl.
*A24F 47/00*   (2006.01)
*H01M 2/10*   (2006.01)
*H01M 2/20*   (2006.01)

(52) U.S. Cl.
CPC ......... *A24F 47/008* (2013.01); *H01M 2/1044* (2013.01); *H01M 2/1055* (2013.01); *H01M 2/20* (2013.01); *H01M 2220/30* (2013.01)

(58) Field of Classification Search
CPC .. H01M 2220/30; H01M 2/20; H01M 2/1055; H01M 2/1044; A24F 47/008
(Continued)

(56) References Cited

U.S. PATENT DOCUMENTS 9,032,968 B2    5/2015  Glasberg et al.
2014/0290650 A1*  10/2014  Ivey ..................... A24F 47/008
                                                             128/202.21
(Continued)

FOREIGN PATENT DOCUMENTS

CN    201210862 Y    3/2009
CN    101869356 A    10/2010
(Continued)

OTHER PUBLICATIONS

European Search Report dated Jul. 24, 2017 for European application No. 14880362.0.

*Primary Examiner* — Abdullah Riyami
*Assistant Examiner* — Nelson R Burgos-Guntin
(74) *Attorney, Agent, or Firm* — Ohlandt, Greeley, Ruggiero & Perle, LLP (57) ABSTRACT

A battery rod having falling protection design and an electronic cigarette are provided. The battery rod having falling protection design includes a battery cartridge, a connection unit and a charging assembly. The charging assembly includes an inner electrode, an insulation ring and an outer electrode; the outer electrode is inserted inside the battery cartridge, the insulation ring is inserted inside the outer electrode, the inner electrode is provided on the insulation ring, and the inner electrode and the outer electrode are located at internal and external portions of the insulation ring respectively. The outer electrode includes one end provided with a retaining section which may be retained on an end face of the battery cartridge and another end provided (Continued)

with an obstruction section which may obstruct the insulation ring from moving inward.

20 Claims, 7 Drawing Sheets

(58) Field of Classification Search
USPC .................................. 131/329, 271, 273
See application file for complete search history.

(56) References Cited

U.S. PATENT DOCUMENTS

| | | | | |
|---|---|---|---|---|
| 2014/0373833 | A1* | 12/2014 | Liu | ............ A61M 11/042 |
| | | | | 128/202.21 |
| 2015/0020831 | A1 | 1/2015 | Weigensberg et al. | |
| 2015/0107609 | A1* | 4/2015 | Liu | ............. A24F 47/008 |
| | | | | 131/329 |
| 2015/0173422 | A1* | 6/2015 | Liu | ............. A24F 47/008 |
| | | | | 131/329 |
| 2015/0320115 | A1* | 11/2015 | Liu | ............. A24F 47/008 |
| | | | | 131/329 |
| 2016/0000148 | A1* | 1/2016 | Liu | ............. A24F 47/008 |
| | | | | 131/329 |
| 2016/0192710 | A1* | 7/2016 | Liu | ................ H05B 3/40 |
| | | | | 131/329 |
| 2016/0360793 | A1* | 12/2016 | Liu | ................ H01M 2/1055 |
| 2017/0027221 | A1* | 2/2017 | Liu | ................ H02J 7/0044 |
| 2017/0055586 | A1* | 3/2017 | Liu | ............. A24F 47/008 |
| 2017/0196265 | A1* | 7/2017 | Liu | ................ F16K 15/02 |

FOREIGN PATENT DOCUMENTS

| | | |
|---|---|---|
| CN | 203121009 U | 8/2013 |
| CN | 203168036 U | 9/2013 |
| CN | 203386835 U | 1/2014 |
| CN | 203398241 U | 1/2014 |
| WO | 2013093695 A1 | 6/2013 |
| WO | 2014008646 A1 | 1/2014 |

* cited by examiner

BATTERY ROD HAVING FALLING PROTECTION DESIGN AND ELECTRONIC CIGARETTE

The present application is the national phase of International Application No. PCT/CN2014/072782, titled "BATTERY ROD HAVING FALLING PROTECTION DESIGN AND ELECTRONIC CIGARETTE", filed on Mar. 3, 2014, which claims the priority to Chinese Patent Application No. 201420041618.8, entitled "BATTERY ROD HAVING FALLING PROTECTION DESIGN AND ELECTRONIC CIGARETTE", filed on Jan. 22, 2014 with the State Intellectual Property Office of the PRC, which are incorporated herein by reference in their entireties.

BACKGROUND

1. Field of the Disclosure

The present application relates to the technical field of electronic cigarette, and particularly, to a battery rod having a falling protection design and an electronic cigarette.

2. Discussion of the Background Art

The electronic cigarette is a common electronic product simulating the tobacco cigarette and mainly includes a liquid storage cotton, an atomizer and a battery rod. The battery rod provides power to the atomizer to heat the atomizer, and the liquid in the liquid storage cotton is vaporized to aerosolize, thereby achieving an effect of tobacco cigarette simulation.

Figure 1:
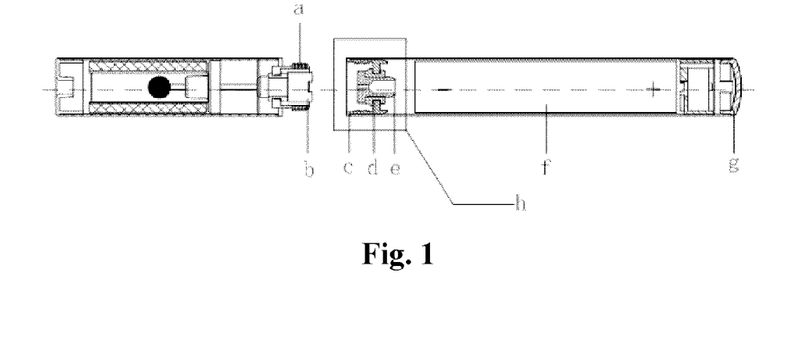
FIG. 1 is a sectional view of a conventional electronic cigarette.

Reference may be made to FIG. 1, where a is an external thread, b is an upper electrode, c is an internal thread, d is an upper insulation ring, e is a charging electrode, f is a battery, g is a lamp cap and h is a charging end. In a conventional electronic cigarette, the charging electrode e is provided on the battery rod where the battery rod connects with an atomizer. In usage, to charge the electronic cigarette, firstly the atomizer is detached from the battery rod, and then a connection end of a charger is connected to the charging electrode e.

However, since a user needs to detach the atomizer at each charging, which brings a great inconvenience to the user; and at a position where the atomizer connects with the battery rod, the external thread a and the internal thread c may easily be worn out due to long term use, which results in unstable connection and poor user experience.

In view of the above, it is an important and urgent technical disadvantage to be solved by those skilled in the art to optimize the structure of the electronic cigarette to facilitate the charging of the electronic cigarette performed by the user.

SUMMARY

The present application discloses a battery rod having a falling protection design and an electronic cigarette. By inserting a charging assembly, which is for being electronically connected with a charger, at one end of the battery rod away from a connection unit, and providing a falling protection design for the charging assembly, the electronic cigarette may be charged directly without detaching an atomizer from a battery assembly, and the charging assembly may be protected in case the electronic cigarette falls.

A battery rod having a falling protection design provided in the application is applied to assemble with an atomizer to form an electronic cigarette. The battery rod includes: a battery cartridge, a battery accommodated in the battery cartridge, and a connection unit which is inserted at one end of the battery cartridge and is configured to connect with the atomizer. A charging assembly configured to electronically connect with a charger is inserted at one end of the battery cartridge away from the connection unit, and the charging assembly comprises an inner electrode, an insulation ring and an outer electrode.

The outer electrode is inserted inside the battery cartridge, the insulation ring is inserted inside the outer electrode, the inner electrode is provided on the insulation ring, and the inner electrode and the outer electrode are located on an internal portion and an external portion of the insulation ring respectively; the outer electrode includes one end provided with a retaining section which is retainable on an end face of the battery cartridge, and another end provided with an obstruction section which obstructs the insulation ring from moving inward; and the inner electrode and the outer electrode are electronically connected to two electrodes of the battery respectively.

Optionally, the inner electrode also coats a surface of one end of the insulation ring.

Optionally, the obstruction section is a position limiting step provided on an inner circumferencial surface of the outer electrode.

Optionally, the obstruction section is retaining hole provided on the outer electrode; and a retaining member matching with the retaining hole is provided on the insulation ring.

Optionally, an annular groove is provided at one end portion of the insulation ring, an inner groove wall and an outer groove wall opposite to each other are formed inside the groove, and the inner electrode is provided on the insulation ring and coats the inner groove wall.

Optionally, the insulation ring is provided with an insertion groove, an insertion piece matching with the insertion groove is provided on the inner electrode, and the inner electrode is sleeved on and fixed on the inner groove wall through the insertion piece.

Optionally, the insertion piece further includes a folding section;

the folding section is provided at a bottom portion of the insertion piece, and is configured to fix the inner electrode on the insulation ring in a bending manner.

Optionally, a lamp configured to simulate a lighted cigarette is provided at one end of the battery rod far away from the connection unit, and several light-transmitting holes are provided on one end surface of the inner electrode.

Optionally, an end surface of the top of the battery assembly including the inner electrode, the insulation ring and the outer electrode is in shape of a spherical cap.

An electronic cigarette provided in the application includes an atomizer and a battery rod, where the battery rod is as the battery rod as described above.

The battery rod having the falling protection design and the electronic cigarette provided in the application have the following beneficial effects.

a. By providing the charging assembly, which is for being electronically connected with a charger, at one end away from the connection unit, the electronic cigarette in the application may be charged directly without detaching the atomizer from the battery rod, which may bring a great convenience to the usage and may avoid unstable connection due to frequent detachment of the battery rod from the atomizer.

b. Since the inner electrode is provided on the insulation ring and coats one end surface of the insulation ring, the reliability of a connection between the inner electrode and the insulation ring may be improved, and the inner electrode is avoided from coming into the battery cartridge in a case that the inner electrode is striken by external force; in addition, with this kind of structure, a contact area between the inner electrode and a charger may be increased, thereby improving the charging reliability.

c. Since the retaining section, which may be retained on the end surface of the battery cartridge, is provided at one end of the outer electrode, and the other end of the outer electrode is provided with an obstruction section which may obstruct the insulation ring from moving inward, the charging assembly may be avoided from coming into the battery cartridge in a case that the charging assembly is striken by external force.

BRIEF DESCRIPTION OF THE DRAWINGS

For more clearly illustrating a technical solution of embodiments of the present application or conventional technology, drawings referred to describe the embodiments or the conventional technology are briefly described hereinafter. Apparently, the drawings in the following description are only for several embodiments of the present application, and for those skilled in the art, other drawings may be obtained based on these drawings without any creative efforts.

DETAILED DESCRIPTION OF THE EMBODIMENTS

The present application discloses a battery rod having a falling protection design and an electronic cigarette. By inserting a charging assembly, which is for being electronically connected with a charger, at one end of the battery rod away from a connection unit, and providing a falling protection design for the charging assembly, the electronic cigarette may be charged directly without detaching an atomizer from a battery assembly, and the charging assembly may be protected in case the electronic cigarette falls.

Technical solutions according to embodiments of the application are described clearly in detail hereinafter in conjunction with drawings in the embodiments of the present application. Apparently, the described embodiments are not all but only a part of the embodiments of the present application. All the other embodiments made by those with ordinary skills in the art based on the embodiments of the application without any creative efforts shall be within the protection scope of the present application.

Reference can be made to FIGS. 2-6 and FIGS. 7-11, which respectively are structural views according to a first embodiment and a second embodiment of the application. A battery rod having a falling protection design provided in the present application includes a battery cartridge 1, a battery 2 accommodated in the battery cartridge 1, and a connection unit 3 which is inserted at one end of the battery cartridge 1 and is used to connect with the atomizer. A charging assembly 4 used to electronically connect with a charger is arranged at one end of the battery cartridge 1 away from the connection unit 3; the charging assembly includes an inner electrode 41, an insulation ring 42 and an outer electrode 43.

The outer electrode 43 is inserted inside the battery cartridge 1. The insulation ring 42 is inserted inside the outer electrode 43, and the inner electrode 41 is provided on the insulation ring 42. The inner electrode 41 and the outer electrode 43 are arranged at two portions of the insulation ring 42 respectively. One end of the outer electrode 43 is provided with a retaining section 431 which may be retained on one end face of the battery cartridge 1, and the other end of the outer electrode 43 is provided with an obstruction section 432 which may obstruct the insulation ring 42 from moving inward. The inner electrode 41 and the outer electrode 43 are electronically connected to two electrodes of the battery respectively.

The battery rod having the falling protection design provided in the present application includes the battery cartridge 1, the battery 2, the connection unit 3 and the charging assembly 4, and the charging assembly 4 includes the inner electrode 41, the insulation ring 42 and the outer electrode 43. In a case that an electronic cigarette needs to be charged, charging of the electronic cigarette may be implemented solely by connecting a charging device with the inner electrode 41 and the outer electrode 43 of the battery rod, while there is no need to detach the battery rod from an atomizer in advance. Hence, it is convenient for a user to operate, the unstable connection due to frequent detachment of the battery rod from the atomizer is avoided, and with the configuration of the retaining section 431 and the obstruction section 432, the battery rod is prevented from getting dented or broken down as a result of collision in case the battery rod falls down.

Since the retaining section 431, which may be retained on the end face of the battery cartridge 1, is provided at one end of the outer electrode 43, and the obstruction section 432, which may obstruct the insulation ring from moving inward, is provided at the other end of the outer electrode 43, the charging assembly 4 may be avoided from coming into the battery cartridge in a case that the charging assembly 4 is striken by external force.

The above mentioned inner electrode 41 may be a conductive sheet metal formed by punching; the insulation ring 42 may be made of plastic or bakelite; and the outer electrode 43 may be a metal sleeve processed by a metal turning technique, and an outer surface of the metal sleeve is taken as a conductive electrode.

Optionally, an annular groove 421 is provided at one end portion of the insulation ring 42, and an inner groove wall and an outer groove wall opposite to each other are formed in the groove 421; the inner electrode 41 is provided on the insulation ring 42 and coats the inner groove wall.

Optionally, the inner electrode 41 also coats the surface of one end of the insulation ring 42. As the inner electrode 41 is provided on the insulation ring 42 and coats the surface of one end of the insulation ring 42, the reliability of a connection between the inner electrode 41 and the insulation ring 42 is enhanced and the inner electrode 41 is avoided from moving inward in case it is striken by external force; furthermore, with this structure, the contacting area between the inner electrode 41 and the charger may be increased, thereby improving the charging reliability.

Besides, as the inner electrode 41, the insulation ring 42 and the outer electrode 43 are connected through mutual nestings and insertions, and the inner electrode 41 is provided on the insulation ring 42 and coats the surface of one end of the insulation ring 42, a connection structure is simple and compact and an assembly is convenient, which ensures a simple structure of an end portion of the charging assembly and avoids the inconvenience in usage caused by unreasonable designs. In addition, an assembled charging assembly may be inserted directly at one end of the battery cartridge during assembling, thereby improving production efficiency.

Optionally, the obstruction section 432 is a position limiting step provided on an inner circumferencial surface of the outer electrode 43.

Figure 2:
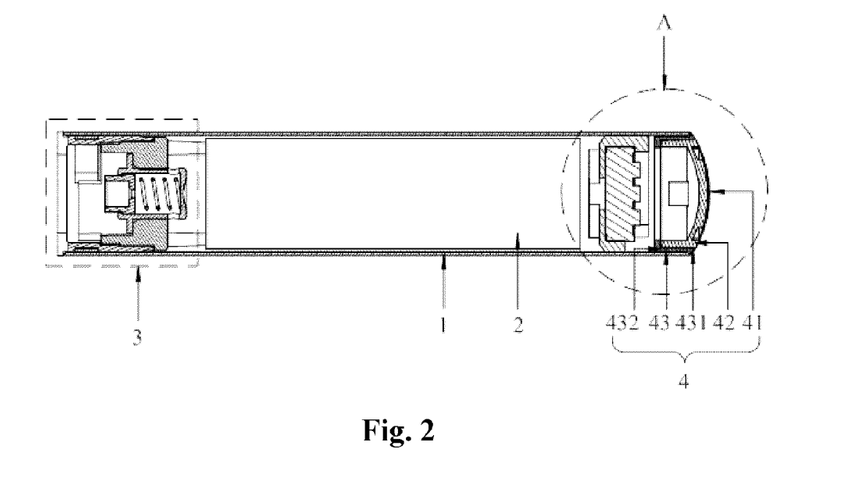
FIG. 2 is a first sectional structural view of a battery rod having a falling protection design according to a first embodiment of the application.
Figure 3:
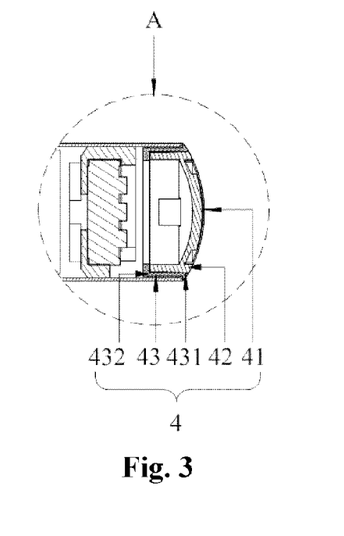
FIG. 3 is an enlarged view of zone A in FIG. 2.
Figure 4:
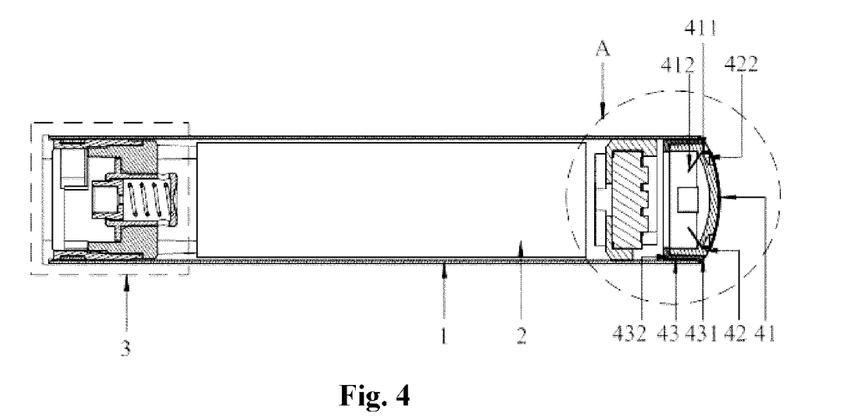
FIG. 4 is a second sectional structural view of the battery rod having the falling protection design according to the first embodiment of the application.
Figure 5:
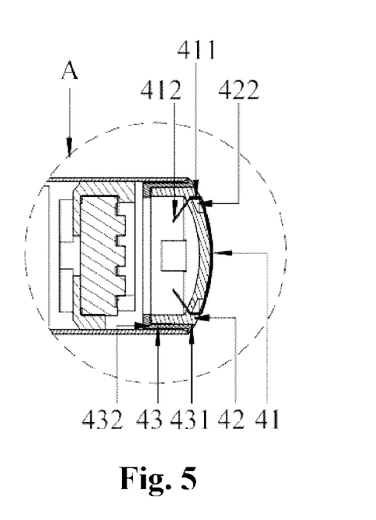
FIG. 5 is an enlarged view of zone A in FIG. 4.
Figure 6:
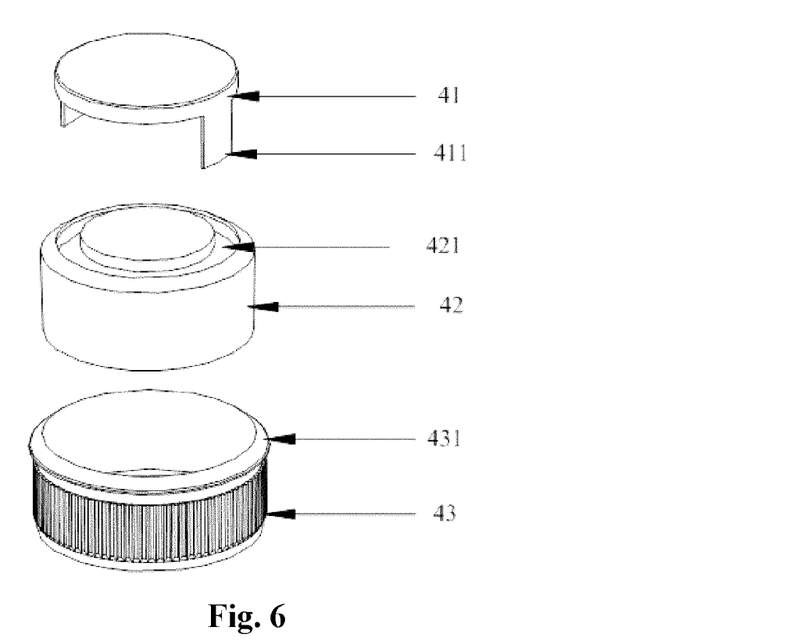
FIG. 6 is a first exploded structural view of a charging assembly of the battery rod having the falling protection design according to the first embodiment of the application.

Reference can be made to FIG. 2 and FIG. 3. The position limiting step may be an annular ring which is poisoned against a bottom end of the insulation ring 42, where the cross-sectional area of the annular ring may be greater than, less than or equal to that of the bottom end of the insulation ring 42, which is not limited herein. In a case that an end portion of the charging assembly 4 is striken by an external force toward the connection unit 3, a displacement of the insulation ring 42 toward the connection unit 3 may be effectively avoided due to the role of the annular ring provided on the outer electrode 43, thereby improving the solidness and reliability of the battery rod.

Optionally, the obstruction section 432 is a retaining hole provided on the outer electrode 43; and a retaining member 423 matching with the retaining hole is provided on the insulation ring 42.

Optionally, the obstruction section 432 is a retaining member provided on the outer electrode 43; and a retaining hole matching with the retaining member is provided on the insulation ring 42.

Figure 7:
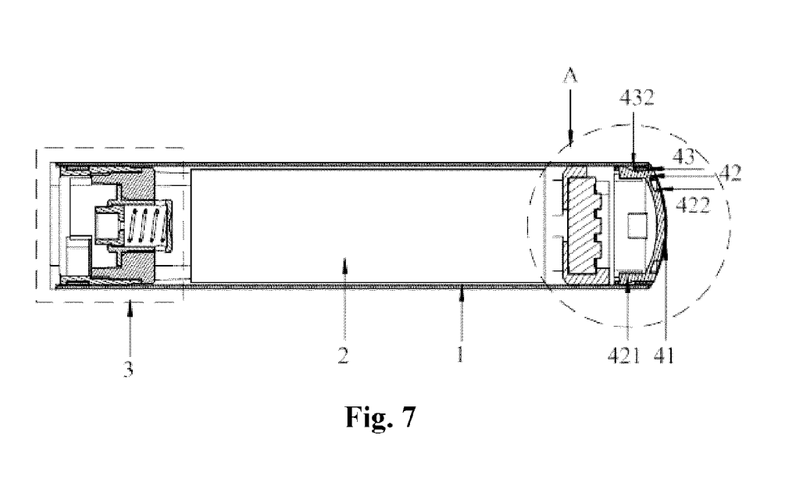
FIG. 7 is a first sectional structural view of a battery rod having a falling protection design according to a second embodiment of the application.
Figure 8:
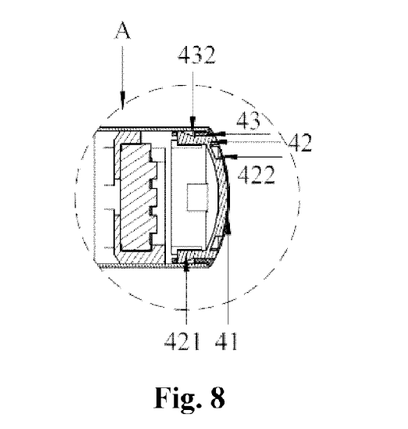
FIG. 8 is an enlarged view of zone A in FIG. 7.
Figure 9:
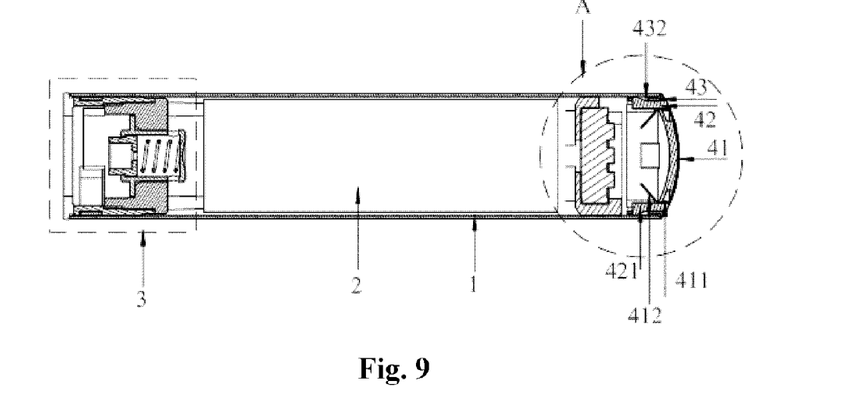
FIG. 9 is a second sectional structural view of the battery rod having the falling protection design according to the second embodiment of the application.
Figure 10:
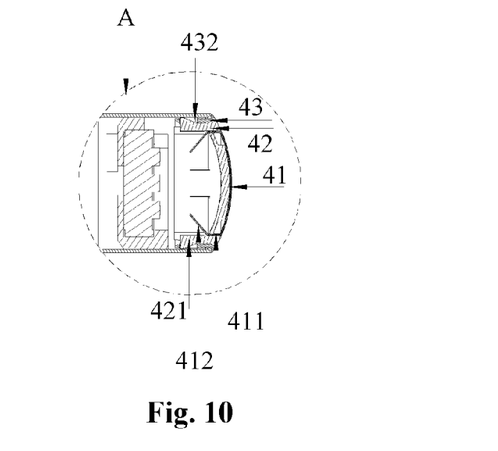
FIG. 10 is an enlarged view of zone A in FIG. 9.
Figure 11:
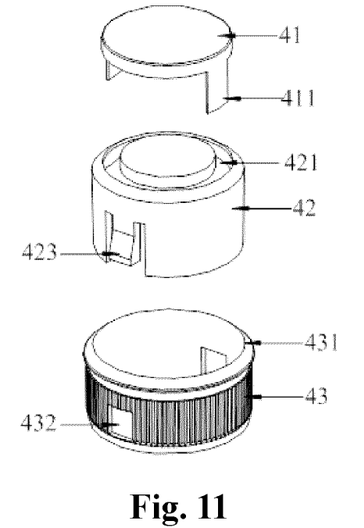
FIG. 11 is a second exploded structural view of the battery rod having the falling protection design according to the second embodiment of the application.

Reference can be made to FIG. 7 and FIG. 8, with the configuration of the retaining member and the retaining hole, a displacement of the insulation ring 42 in the direction toward the connection unit 3 or in the direction away from the connection unit 3 in case of exerted by external force is avoided. In assembling the charging assembly 4, the assembling and connections of individual parts inside the charging assembly 4 are more firm and reliable with the retaining design.

Optionally, an insertion groove 422 is provided on the insulation ring 42, an insertion piece 411 matching with the insertion groove 422 is provided on the inner electrode 41, and the inner electrode 41 is sleeved on and fixed on the inner groove wall through the insertion piece 411. With the configuration of the insertion groove 422, the inner electrode 41 may be effectively fixed. It may be understood that, the insulation ring 42 may be provided with no insertion groove 422, and in this case, the inner electrode 41 may be embodied as a barrel having an opening at one end.

Optionally, the insertion piece 411 further includes a folding section 412;

reference is made to FIG. 4, FIG. 5, FIG. 9 and FIG. 10, the folding section 412 is provided at a bottom portion of the insertion piece 411, and is configured to fix the inner electrode 41 on the insulation ring 42 in a bending manner.

Optionally, the end surface of the top of the charging assembly 4 including the inner electrode 41, the insulation ring 42 and the outer electrode 43 is in shape of a spherical cap. With the spherical cap shaped structure, the structure of the end portion of the battery rod is simplified, and the inner electrode 41 and the outer electrode 43 are easy to be electronically connected with the charger, thereby improving the charging reliability.

Optionally, a lamp for simulating a lighted cigarette is provided at one end of the battery rod away from the connection unit 3, and an end surface of the inner electrode 41 is provided with several light-transmitting holes.

Figure 12:
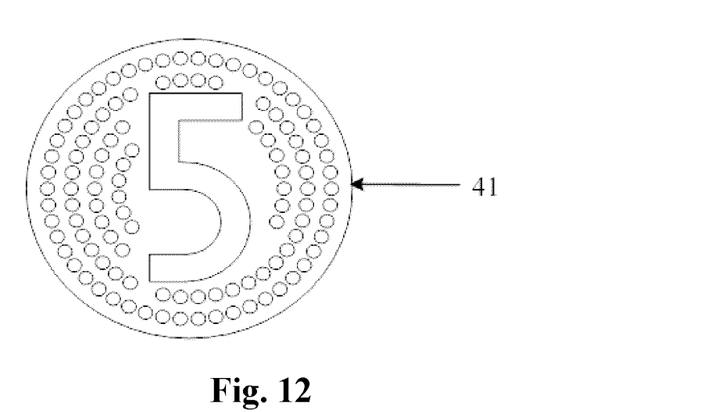
FIG. 12 is a structural schematic view of an inner electrode of a battery rod having a falling protection design according to a third embodiment of the application.

Reference can be made to FIG. 12, which shows a battery rod according to a third embodiment of the application. Different from the first embodiment, in the third embodiment, a lamp for simulating a lighted cigarette is further provided on the battery rod and several light-transmitting holes are provided on the inner electrode 41. Since the inner electrode 41 is made of a solid metal material which is non-transmittable for light, the area of the end surface of the inner electrode 41 is made as large as possible due to the light-transmitting holes, thereby improving the charging reliability and achieving the simulation of the lighted cigarette. The light-transmitting holes may form a circle, a letter or a digit, or any combination of circle, letter and digit. The lamp may produce a brilliant visional effect through the light-transmitting holes. With patterns formed by the light-transmitting holes on the internal electrode 41, individual demands of users may be well satisfied, and value in using the electronic cigarette provided in the application is further improved.

Figure 13:
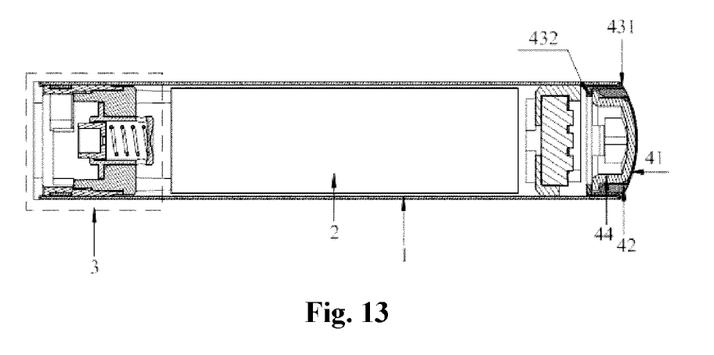
FIG. 13 is a structural schematic view of an inner electrode of a battery rod having a falling protection design according to a forth embodiment of the application.

Reference can be made to FIG. 13, which shows a battery rod according to a fourth embodiment of the application. Different from the first embodiment, the charging assembly in the present embodiment further includes an insulation holder 44 sheathed inside the insulation ring 42. The inner electrode 41 is provided on both the insulation ring 42 and the insulation holder 44 and coats one end of the insulation holder 44, and the other end of the insulation holder 44 is retained against the obstruction section 432. One end of the insulation holder 44 away from the inner electrode 41 is provided with an annular bump, and one end of the insulation ring 42 is retained against the annular bump.

The battery rod provided in the application is described hereinabove. By inserting a charging assembly, which is used to electronically connect with the charger, at one end of the battery rod away from the connection unit, the electronic cigarette may be charged directly without detaching the atomizer from the battery rod, thereby bringing a great convenience to usage.

Figure 14:
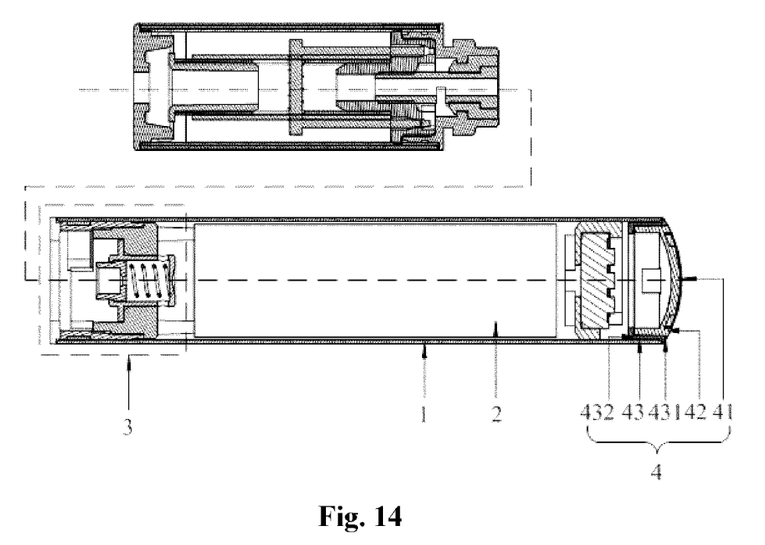
FIG. 14 is a structural schematic view of an electronic cigarette according to an embodiment of the application.

An electronic cigarette according to an embodiment of the application is described hereunder. As shown in FIG. 14, the electronic cigarette provided in the application includes an atomizer and a battery rod, and the battery rod may be the battery rod having the falling protection design according to the first embodiment or the second embodiment or the third embodiment of the application. In the embodiment, the atomizer and the battery rod are connected in a detachable manner. It shall be understood that the atomizer and the battery rod may be provided as an undetachable integration, which is not limited herein.

Since the battery rod of the electronic cigarette in the application is of the same structure with the battery rod having the falling protection design according to the first or the second or the third embodiment of the application, the electronic cigarette in the application shall also possess the same technical effects. The atomizer is a conventional atomizer, which is not detailed herein.

Detailed descriptions of the battery rod having the falling protection design and the electronic cigarette provided in the application are given hereinabove. Specific examples are applied to describe the principle and embodiments of the application. The illustration of the above embodiments merely helps in understanding the method and core mind of the application. It shall be noted that, for those with ordinary skills in the art, various improvements and modifications may be made to the application without departing from the principle of the application, and these improvements and modifications shall be within the protection scope defined by the claims of the application.

The invention claimed is:

1. A battery rod having a falling protection design, applied to assemble with an atomizer to form an electronic cigarette, wherein the battery rod comprises: a battery cartridge, a battery accommodated in the battery cartridge, and a connection unit which is inserted at one end of the battery cartridge and is configured to connect with the atomizer, wherein a charging assembly configured to electronically connect with a charger is inserted at one end of the battery cartridge away from the connection unit, and the charging assembly comprises an inner electrode, an insulation ring and an outer electrode;
wherein the outer electrode is inserted inside the battery cartridge, the insulation ring is inserted inside the outer electrode, the inner electrode is provided on the insulation ring, and the inner electrode and the outer electrode are located on an internal portion and an external portion of the insulation ring respectively; the outer electrode includes one end provided with a retaining section which is retainable on an end face of the battery cartridge, and another end provided with an obstruction section which obstructs the insulation ring from moving inward; and the inner electrode and the outer electrode are electronically connected to two electrodes of the battery respectively; and
wherein the obstruction section is a retaining hole provided on the outer electrode; and
a retaining member matching with the retaining hole is provided on the insulation ring.

2. The battery rod according to claim 1, wherein the inner electrode further coats a surface of one end of the insulation ring.

3. The battery rod according to claim 1, wherein an end portion of the insulation ring is provided with an annular groove, an inner groove wall and an outer groove wall opposite to each other are formed in the groove, and the inner electrode is provided on the insulation ring and coats the inner groove wall.

4. The battery rod according to claim 3, wherein an insertion groove is provided on the insulation ring, an insertion piece matching with the insertion groove is provided on the inner electrode, and the inner electrode is sleeved on and fixed on the inner groove wall through the insertion piece.

5. The battery rod according to claim 4, wherein
the insertion piece further comprises a folding section; and
the folding section is provided at a bottom portion of the insertion piece, and is configured to fix the inner electrode on the insulation ring in a bending manner.

6. The battery rod according to claim 1, wherein a lamp configured to simulate a lighted cigarette is provided on one end of the battery rod far away from the connection unit, and one end surface of the inner electrode is provided with a plurality of light-transmitting holes.

7. The battery rod according to claim 1, wherein an end surface of the top of the battery assembly comprising the inner electrode, the insulation ring and the outer electrode is in shape of a spherical cap.

8. An electronic cigarette, comprising an atomizer and a battery rod, wherein the battery rod has a falling protection design, applied to assemble with an atomizer to form an electronic cigarette, wherein the battery rod comprises: a battery cartridge, a battery accommodated in the battery cartridge, and a connection unit which is inserted at one end of the battery cartridge and is configured to connect with the atomizer, wherein a charging assembly configured to electronically connect with a charger is inserted at one end of the battery cartridge away from the connection unit, and the charging assembly comprises an inner electrode, an insulation ring and an outer electrode;
wherein the outer electrode is inserted inside the battery cartridge, the insulation ring is inserted inside the outer electrode, the inner electrode is provided on the insulation ring, and the inner electrode and the outer electrode are located on an internal portion and an external portion of the insulation ring respectively; the outer electrode includes one end provided with a retaining section which is retainable on an end face of the battery cartridge, and another end provided with an obstruction section which obstructs the insulation ring from moving inward; and the inner electrode and the outer electrode are electronically connected to two electrodes of the battery respectively; and
wherein the obstruction section is a retaining hole provided on the outer electrode; and
a retaining member matching with the retaining hole is provided on the insulation ring.

9. The electronic cigarette according to claim 8, wherein the inner electrode further coats a surface of one end of the insulation ring.

10. The electronic cigarette according to claim 8, wherein an end portion of the insulation ring is provided with an annular groove, an inner groove wall and an outer groove wall opposite to each other are formed in the groove, and the inner electrode is provided on the insulation ring and coats the inner groove wall.

11. The electronic cigarette according to claim 10 wherein an insertion groove is provided on the insulation ring, an insertion piece matching with the insertion groove is provided on the inner electrode, and the inner electrode is sleeved on and fixed on the inner groove wall through the insertion piece.

12. The electronic cigarette according to claim 11, wherein
the insertion piece further comprises a folding section; and
the folding section is provided at a bottom portion of the insertion piece, and is configured to fix the inner electrode on the insulation ring in a bending manner.

13. The electronic cigarette according to claim 8, wherein a lamp configured to simulate a lighted cigarette is provided on one end of the battery rod far away from the connection unit, and one end surface of the inner electrode is provided with a plurality of light-transmitting holes.

14. The electronic cigarette according to claim 8, wherein an end surface of the top of the battery assembly comprising the inner electrode, the insulation ring and the outer electrode is in shape of a spherical cap.

15. The electronic cigarette according to claim 8, wherein the inner electrode further coats a surface of one end of the insulation ring.

16. The electronic cigarette according to claim 8, wherein an end portion of the insulation ring is provided with an annular groove, an inner groove wall and an outer groove wall opposite to each other are formed in the groove, and the inner electrode is provided on the insulation ring and coats the inner groove wall.

17. The electronic cigarette according to claim 16, wherein an insertion groove is provided on the insulation ring, an insertion piece matching with the insertion groove is provided on the inner electrode, and the inner electrode is sleeved on and fixed on the inner groove wall through the insertion piece.

18. The electronic cigarette according to claim 17, wherein the insertion piece further comprises a folding section; and the folding section is provided at a bottom portion of the insertion piece, and is configured to fix the inner electrode on the insulation ring in a bending manner.

19. The electronic cigarette according to claim 8, wherein a lamp configured to simulate a lighted cigarette is provided on one end of the battery rod far away from the connection unit, and one end surface of the inner electrode is provided with a plurality of light-transmitting holes.

20. The electronic cigarette according to claim 8, wherein an end surface of the top of the battery assembly comprising the inner electrode, the insulation ring and the outer electrode is in shape of a spherical cap.

* * * * *